UNITED STATES PATENT OFFICE.

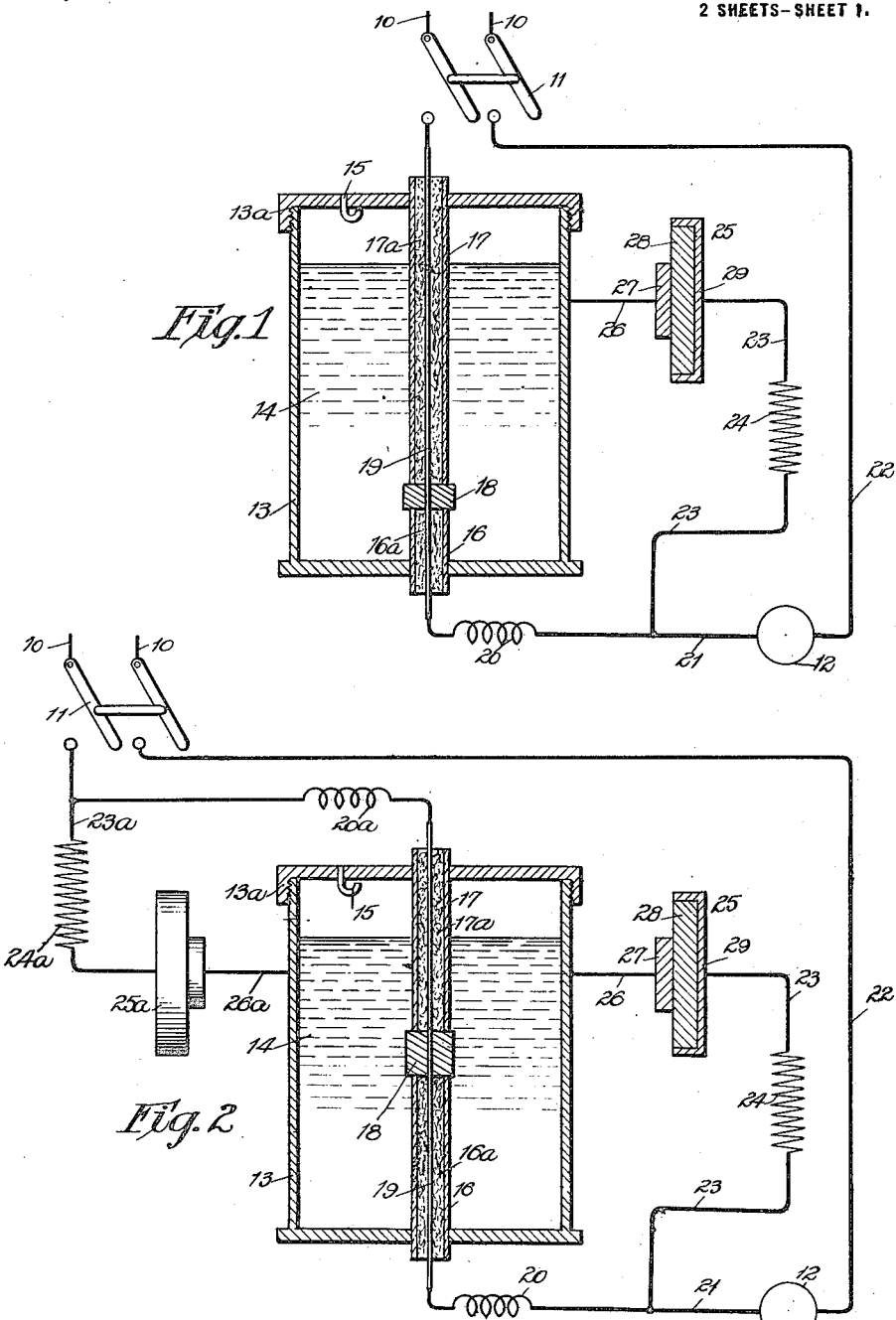
E. O. SCHWEITZER.
MEANS AND METHOD FOR METERING ELECTRICITY.
APPLICATION FILED MAR. 6, 1916.
1,254,939.
Patented Jan. 29, 1918.
2 SHEETS—SHEET 1.
Witnesses:
Albin E. Ahlberg
Robert F. Brack
Inventor
Edmund O. Schweitzer
By Williams & Bradbury
Attorneys E. O. SCHWEITZER.
MEANS AND METHOD FOR METERING ELECTRICITY.
APPLICATION FILED MAR. 6, 1916.
1,254,939.
Patented Jan. 29, 1918.
2 SHEETS—SHEET 2.
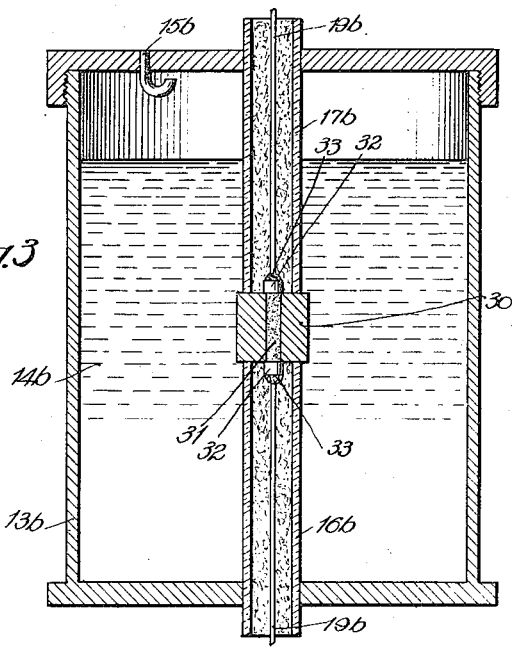
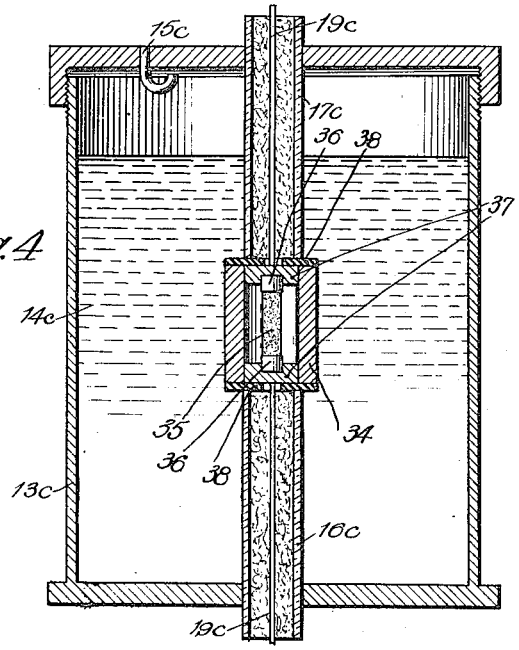
Witnesses:
Albin C. Ahlberg.
Robert F. Bracke
Inventor
Edmund O. Schweitzer
By Williams & Bradbury
Attorneys

EDMUND O. SCHWEITZER, OF CHICAGO, ILLINOIS.

MEANS AND METHOD FOR METERING ELECTRICITY.

1,254,939.  Specification of Letters Patent.  Patented Jan. 29, 1918.

Application filed March 6, 1916. Serial No. 82,347.

*To all whom it may concern:*

Be it known that I, EDMUND O. SCHWEITZER, a citizen of the United States, residing at Chicago, in the county of Cook and State of Illinois, have invented a certain new and useful Improvement in Means and Methods for Metering Electricity, of which the following is a full, clear, concise, and exact description, reference being had to the accompanying drawings forming a part of this specification.

My invention relates to the art of electricity metering, the hereinafter described application of my invention being particularly adaptable for use in the measurement of alternating current supply and affording a basis for payment to the central station company by the consumer for electrical energy furnished to and consumed by him.

The systems now generally employed by central station companies not only require expensive equipment subject to rapid deterioration and entailing a high cost for maintenance, but also require office labor and supervision of such a high cost and grade that a considerable portion of the possible earnings of the central station companies, particularly where the customers are scattered over a large area and consume relatively small amounts of electrical energy per month, is not only lost but business of this class is oftentimes done at an actual loss to the central station company.

My invention hereinafter described and claimed provides a system of electrical measurement and power control particularly applicable, without danger of inaccurate measurement or lack of proper control, to that class of business hereinbefore mentioned as unprofitable, and renders such class of business profitable to the central station company.

Broadly stated, I accomplish this desirable end by providing means, preferably located at or near the point of energy consumption, arranged and adapted to prevent the further consumption of energy at that point, as by opening or otherwise rendering the load circuit inoperative after a predetermined quantity of electrical energy has been consumed.

In accordance with my invention, I render the subscriber's load circuit inoperative after a predetermined quantity of electricity has been consumed by electrolytic action upon a part of the consumer's load circuit. A preferred arrangement for accomplishing this end is to include in series with the consumer's load circuit a conductor, for instance a cylinder of copper, which forms the anode of an electrolytic cell, an electrolytic circuit or circuits being established when the load circuit is in use, as for instance by establishing a shunt or shunts including the electrolytic cell in parallel with one of the conductors leading to the translating devices. In alternating current work, as will hereinafter be more fully explained, I include in each electrolytic or shunt circuit means for rectifying the shunt current, the rectifier serving to permit current to flow through its associated shunt circuit during one-half of the alternating current cycle, but effectually preventing the flow of current through the shunt during the other half of the cycle. As a result of this arrangement the current flowing through the shunt circuit is in the nature of a rapidly pulsating direct current, which is substantially directly proportional to the alternating current traversing the main circuit. The electrolytic action of the shunt current causes the gradual disintegration or dissolution of the anode cylinder as the consumption of electrical energy continues. The arrangement of parts is such that the anode cylinder is completely dissolved after a predetermined quantity of electricity has been consumed, and the circuit for the translating device or devices is thus opened.

These and other characteristic features of the method and apparatus of my invention will be set forth in detail in the following description, wherein reference is made to the accompanying drawings, in which—

Figure 1 illustrates more or less diagrammatically an apparatus embodying my invention, this particular arrangement being arranged to utilize but one-half of each alternating current cycle for metering purposes;

Fig. 2 illustrates a somewhat similar arrangement, wherein both halves of the alternating current cycle are utilized in shunt circuits for metering purposes; and Fig. 3 and 4 illustrate two forms of anode construction that may be used in an electrolytic metering device of the type herein shown and described.

Similar characters of reference refer to similar parts throughout the drawings.

Referring first to Fig. 1, at 10, 10 I have illustrated the leads of an alternating current line; at 11, a switch; and at 12, a translating device or devices arranged to be connected in circuit with the source of alternating current supply. By reference numeral 13 is designated a copper cylinder or container, which as will more fully hereinafter appear, constitutes the cathode of an electrolytic cell and an electrolyte container as well. At 14 is shown a suitable electrolyte which may conveniently be in the form of a neutral copper sulfate solution. The cathode cylinder 13 is provided with a cap 13$^a$, which desirably carries a capillary tube 15 to permit the escape of gas from the space above the electrolyte 14. Supported by the bottom and cap of the cathode cylinder 13 are the alined tubes 16 and 17, which may be of glass or other insulating material, or may be of metal, in which last-mentioned case the outer surfaces of the tubes are provided with a covering of insulating material such, for instance, as a coating of non-conducting enamel. Disposed between the adjacent ends of the tubes 16 and 17 is a cylinder 18 of copper or other suitable metal capable of being electrolytically disintegrated. The cylinder 18, which constitutes the anode of the electrolytic cell, is in mechanical contact with the electrolyte 14. The joints between the ends of the anode cylinder 18 and the adjacent ends of the tubes 16 and 17 are sealed by cement or other suitable means which may, if desired, take the form of compressible washers interposed between the cylinder 18 and the adjacent ends of the tubes 16 and 17.

The circuit for the translating device 12 comprises a conductor 19, reactance or inductive resistance coil 20, conductor 21 and conductor 22. Those portions of the conductor 19 which extend through the tubes 16 and 17 are desirably embedded in paraffin 16$^a$, 17$^a$, the function of which will be hereinafter described. The shunt or electrolytic circuit comprises conductor 23, non-inductive resistance 24 interposed in the conductor 23, and a rectifier designated as a whole by the reference character 25, the rectifier being in turn connected with the cathode cylinder 13 by conductor 26. While I do not propose to limit myself to any particular type of rectifier, I have developed and have in the accompanying drawings illustrated a rectifier that is admirably adapted to accomplish the rectifying of the shunt current in a system of the class now under consideration. This rectifier comprises an aluminum disk 27, one face of which is in mechanical contact with the adjacent face of a relatively large disk 28 of copper sulfid, $Cu_2S$, which in turn is in mechanical contact with and has one end and its cylindrical surface inclosed by a copper disk 29, which last-mentioned disk is provided with a peripheral lip or flange arranged to lie around the cylindrical surface of the copper sulfid disk. The rectifier functions to permit the flow of current from aluminum to copper, but effectually prevents current flow from copper to aluminum.

The conductor 19, as shown by the drawings, extends through the alined tubes 16 and 17 of the electrolytic device and passes through the copper anode cylinder 18, the conductor conveniently being sweated into the cylinder 18 and constituting a part thereof. From the foregoing description it will be seen that the work circuit is connected in series with the cylinder 18 which is exposed to the electrolyte 14 and constitutes the anode of an electrolytic cell.

In operation, during one-half of the alternating current cycle current flows from the supply line through conductor 19 to reactance 20, thence through conductor 21 of the translating device 12, and thence through conductor 22 back to the supply line. However, when this condition exists the reactance 20 causes a flow of current through the shunt or electrolytic circuit which may be traced from anode cylinder 18 into the electrolyte, thence to cathode 13; and from the cathode through conductor 26, rectifier 25, conductor 23 and non-inductive resistance 24 to the conductor 21.

The value of the current traversing the shunt circuit is determined by the shunt circuit resistance as well as the resistance and reactance of that part of the main circuit intermediate the anode 18 and the junction of the conductors 21 and 23. The resistances are so arranged and related that the energy utilized in the shunt circuit is a very small part of, but nevertheless bears a definite relation to the total energy supply. I have described how the several parts function during one-half of the alternating current cycle. During the other half of the cycle the rectifier 25 operates to prevent the flow of current through the shunt circuit, and therefore, in this instance, the circuit for the total current is traced outside of the shunt.

The rapidly pulsating direct current which traverses the shunt circuit and which bears a definite relation to the main current supply acts electrolytically to dissolve the anode 18 into the electrolyte and deposits it upon the cathode cylinder 13. When the cross-section of the anode becomes very small, the slender wire or thread remaining breaks, thus opening the load circuit. Heating of the separated ends of the conductor 19 then serves to melt the paraffin surrounding the same, the paraffin then flowing over the separated ends of the conductor and effectually stopping further current flow either through the main circuit or the shunt circuit.

After the current supply is cut off in the manner just described it is necessary to secure a new electrolytic metering device. These devices may be substituted by the consumer or installed by employees of the central station company, as desired.

The circuit arrangement shown in Fig. 2 comprises, in addition to all of the elements of Fig. 1, an additional series reactance 20$^a$ and an additional shunt circuit comprising the conductors 23$^a$ and 26$^a$, non-inductive resistance 24$^a$, and rectifier 25$^a$. It will be noticed that when the arrangement of Fig. 2 is employed, the anode 18 is substantially twice the mass of the anode of Fig. 1, the reason for this being that when the circuit arrangement of Fig. 2 is employed current flows through one shunt circuit or the other during each half of the alternating current cycle. It will be seen, therefore, that for a cell of the same energy delivery rating as that shown in Fig. 1, the anode shown in Fig. 2 should be of twice the mass of the anode of Fig. 1.

In Figs. 3 and 4 I have illustrated forms of anode construction that may be utilized in the electrolytic cell forming a part of my present invention. In Fig. 3 each of the several elements there illustrated which corresponds in all material respects with parts shown in Figs. 1 and 2 has had applied thereto the same reference character as has been used in Figs. 1 and 2 except that in Fig. 3 the letter "b" has been suffixed to each of the reference characters. In Fig. 3 the anode is indicated at 30 and it will be noted that instead of passing the conductor 19$^b$ through the copper cylinder, or anode, 30, as described in connection with Fig. 1, the cylinder 30 is provided with a core 31 which is preferably of carbon or graphite. The anode cylinder 30 is disposed between the adjacent ends of the tubes 16$^b$ and 17$^b$ with the ends of the core 31 extending into the tubes 16$^b$ and 17$^b$. The ends of the carbon core 31 are desirably copper plated as indicated at 32 in order that the load circuit conductors 19$^b$ may be electrically connected therewith as by soldering, indicated at 33—33. The wires 19$^b$ extending through the tubes 16$^b$ and 17$^b$ are conveniently embedded in paraffin, as heretofore described, although in the arrangement of Fig. 3 the presence of the paraffin is not particularly important. It will be understood that the carbon or graphite core 31 has a considerably lower co-efficient of electrical conductivity than has the metallic portion of the anode. The operation of the electrolytic cell shown in Fig. 3 is substantially like that of the cell previously described until all or substantially all of the metallic part of the anode has been removed by electrolytic dissolution. After the copper portion of the anode has been removed and only the carbon core remains the load circuit remains closed, but its resistance is materially more than normal for the reason that the core 31 alone must carry the total of the load current at that point in the load circuit subjected to electrolytic action. This increase in the resistance of the load circuit with the consequent decrease in load current available to the consumer serves to advise the consumer that it is time to install, or have installed, a new electrolytic metering device.

In Fig. 4 all of the parts which correspond in all material respects with elements of the arrangement shown in Fig. 1 have had applied thereto the same reference characters used in Fig. 1 except that the letter "c" has been suffixed to such reference characters. In the arrangement shown in Fig. 4 the anode comprises a copper cylinder 34 within which is disposed a carbon rod or core 35 provided with copper plated ends 36, the terminals of the carbon core or rod being supported by the copper caps 37—37 which are in electrical contact with, and to all intents and purposes constitute an integral part of the cylindrical copper portion 34 of the anode. The anode structure just described is clamped between the adjacent ends of the tubes 16$^c$ and 17$^c$, compressible washers 38 conveniently being interposed between the anode and the ends of the tubes to secure tight joints. The function of the anode shown in Fig. 4 is substantially that of the anode shown in Fig. 3.

I appreciate that the precise arrangements hereinbefore described need not necessarily be employed in attaining the objects of my invention. For instance, the details of the cell and rectifying devices may be considerably varied. Moreover, while I have shown and described series reactances, I appreciate the fact that non-inductive resistances may be substituted therefor, if desired. Therefore I wish to avail myself of all equivalent arrangement coming within the scope of the appended claims.

What I claim as new and desire to secure by Letters Patent of the United States is:

1. In a system for the distribution and measuring of alternating current the combination with an electrolytic cell comprising an anode, cathode, and an electrolyte, an electricity conducting work circuit connected in series with the anode, a pair of reactance coils in the work circuit, one on each side of the anode, and a pair of shunts leading to the cathode from opposite sides of the anode beyond the reactance coils, and a rectifier and non-inductive resistance in each of said shunts.

2. In combination with an electricity conducting work circuit, an electrolytic bath in which a portion of the conducting circuit is immersed, a shunt for diverting a fractional part of the current traversing the immersed portion of said circuit into the electrolytic bath, and an alternating current rectifier in said shunt.

3. In a system of alternating current distribution the combination with a cathode and electrolyte of an electrolytic cell, a conductor forming a part of an electric work circuit passing through the electrolyte and constituting an anode for the aforesaid cell, together with electrical connections for diverting a part of the current traversing the work circuit through the cell to effect the electrolytic disintegration of the conductor anode, and means for rectifying the current thus diverted through the cell.

4. In a system of electrical distribution a main alternating current circuit, an electrolytic circuit, a rectifier in the electrolytic circuit, and means for diverting a fractional part of the current traversing the main circuit through the electrolytic circuit electrolytically to destroy the effective conductivity of a conducting part of the main circuit.

5. In a system of electrical distribution a circuit connected with a source of alternating current supply, and means for rectifying and utilizing a fractional part of the electrical energy traversing said circuit electrolytically to destroy the effective conductivity of a part of said circuit.

6. In a system of electrical distribution the combination with an alternating current work circuit, an electrolytic cell the anode of which is connected in series with said circuit, a shunt circuit including the electrolytic cell, and means for rectifying the current traversing the shunt circuit.

7. In combination with an alternating current work circuit, an electrolytic cell the anode of which is connected in series with said circuit, an electrolytic shunt circuit including the cell, means for diverting a fractional part of the energy traversing the first circuit through the shunt circuit, and means for rectifying the current traversing the shunt circuit.

8. In a system of alternating current distribution, an electrolytic bath, a cathode, a metallic work circuit, a portion of said circuit being immersed in and exposed to said bath, an electrolytic shunt circuit including the bath and cathode, means for diverting a fractional part of the current traversing the work circuit from the immersed and exposed portion thereof through the shunt circuit electrolytically to disintegrate the immersed portion of the work circuit, and means for rectifying the current traversing the shunt circuit.

9. In a system of alternating current distribution an electrolytic cell comprising an anode, cathode and electrolyte, a work circuit including said anode in series as a conducting part thereof, and means for diverting through the cell a uni-directional pulsating current proportional to the current traversing the work circuit to effect the electrolytic disintegration of the anode.

10. In a system of electrical distribution the combination with an alternating current work circuit, an electrolytic cell comprising an anode, cathode and electrolyte, the anode of said cell connected in series with the work circuit as a conducting part thereof, a reactance coil in the work circuit intermediate the anode and the translating device, means electrically connecting the electrolytic cell in shunt of the reactance coil and a rectifier in the shunt circuit.

11. In combination with an alternating current work circuit, an electrolytic cell comprising an anode, cathode and electrolyte, the anode being connected in series with the work circuit as a conducting part thereof, a reactance coil in the work circuit, means for electrically connecting the electrolytic cell in shunt of the reactance coil, and a rectifier in the shunt circuit.

12. In a system of electrical distribution the combination with an alternating current work circuit, an electrolytic cell comprising an anode, cathode and electrolyte, the anode of said cell connected in series with the work circuit as a conducting part thereof, an impedance in the work circuit, means for electrically connecting the cell in shunt of the impedance, and a rectifier in the shunt circuit.

13. In combination with an alternating current work circuit, an electrolytic cell comprising an anode, cathode, and electrolyte, the anode of said cell connected in series with the work circuit as a conducting part thereof, an impedance in the work circuit, and means for connecting the electrolytic cell in shunt of said impedance, and a rectifier in the shunt circuit, the shunt circuit having sufficient resistance to limit the energy utilized therein to that portion of the total current available for metering purposes.

14. In a system of electrical distribution the combination with an alternating current work circuit, an electrolytic cell in the work circuit, the anode of said cell connected in series with the work circuit as a conducting part thereof, an inductive resistance in the work circuit, means for connecting the electrolytic cell in shunt of the inductive resistance, and a rectifier in the shunt circuit, the shunt circuit having a relatively high non-inductive resistance.

15. In a system of alternating current distribution the combination with a work circuit, an electrolytic cell having the anode thereof connected in the work circuit as a conducting part thereof, means for connecting the cell in a branch circuit, and a rectifier in the branch circuit.

16. In a system of the class described, an alternating current circuit, an electrolytic metering device comprising an anode, cathode and electrolyte, the anode connected in series with the work circuit as a conducting part thereof, two reactance coils in the work circuit, one on each side of the conductor anode, means for connecting the electrolytic cell in shunt of each of said reactance coils, and rectifying means in the shunt circuit connections.

17. In a system of the class described, the combination of an alternating current circuit, an electrolytic metering device comprising an anode, cathode and electrolyte, the anode connected in series with the work circuit as a conducting part thereof, means for connecting the cell in two electrolytic branch circuits, and a rectifier in each of said branch circuits.

18. The method of measuring and controlling the supply of alternating current to a work circuit which consists in diverting a fractional part of the alternating current outside of the work circuit, rectifying the current thus diverted and utilizing the rectified current electrolytically to destroy the effective conductivity of a part of the work circuit.

19. The method which consists in rectifying a fractional part of the alternating current traversing a given circuit and utilizing the resulting uni-directional current electrolytically to destroy the effective conductivity of a part of said circuit.

20. The method of metering electricity supply which consists in rectifying a fractional part of the alternating current traversing a given circuit and passing the rectified current through an electrolytic cell, the anode of which constitutes a conducting part of said circuit.

21. The method of measuring and metering alternating current supply which consists in connecting the anode of an electrolytic cell in series with and as a conducting part of an alternating current circuit and passing direct current through the cell at a rate proportional to the consumption of alternating current.

22. The method of measuring alternating current supply which consists in connecting the anode of an electrolytic cell in series with and as a conducting part of an alternating current circuit, rectifying a fractional part of the alternating current traversing said circuit and passing the resulting uni-directional current through the cell to destroy the effective conductivity of the conductor anode.

23. The method of measuring the supply of alternating current to a given circuit which consists in rectifying and shunting a fractional part of the current traversing said circuit through an electrolytic cell, the anode of which constitutes a conducting part of the circuit.

24. The combination with a work circuit, an electrolytic cell comprising an anode, cathode and electrolyte connected in shunt of the work circuit with the anode interposed in the work circuit as a conducting part thereof, said anode comprising an outer portion having a relatively high co-efficient of electrical conductivity and a core having a lower co-efficient of electrical conductivity.

25. The combination with an electric circuit, an electrolytic cell comprising an anode, cathode and electrolyte connected in shunt of the circuit with the anode interposed in the work circuit as a conducting part thereof, said anode comprising two parts one of which has a lower co-efficient of electrical conductivity than the other.

26. The combination with an electric circuit, an electrolytic cell comprising an anode, cathode and electrolyte connected in shunt of the circuit with the anode interposed in the work circuit as a conducting part thereof, said anode being constituted mainly of metal but having a core of carbonaceous material.

In witness whereof, I hereunto subscribe my name this 1st day of March, A. D. 1916.

EDMUND O. SCHWEITZER.

Witnesses:
A. G. McCaleb,
Robert F. Bracke.